US012169698B2

(12) United States Patent
Asai et al.

(10) Patent No.: US 12,169,698 B2
(45) Date of Patent: *Dec. 17, 2024

(54) SYSTEMS AND METHODS FOR READING COMPREHENSION FOR A QUESTION ANSWERING TASK

(71) Applicant: Salesforce, Inc., San Francisco, CA (US)

(72) Inventors: Akari Asai, San Francisco, CA (US); Kazuma Hashimoto, Menlo Park, CA (US); Richard Socher, Menlo Park, CA (US); Caiming Xiong, Menlo Park, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/463,019

(22) Filed: Sep. 7, 2023

(65) Prior Publication Data

US 2023/0419050 A1    Dec. 28, 2023

Related U.S. Application Data

(63) Continuation of application No. 16/695,494, filed on Nov. 26, 2019, now Pat. No. 11,775,775.

(60) Provisional application No. 62/851,048, filed on May 21, 2019.

(51) Int. Cl.
*G10L 15/22*    (2006.01)
*G06F 40/40*    (2020.01)
*G06F 40/30*    (2020.01)

(52) U.S. Cl.
CPC .............. *G06F 40/40* (2020.01); *G06F 40/30* (2020.01)

(58) Field of Classification Search
None
See application file for complete search history.

(56) References Cited

U.S. PATENT DOCUMENTS

| 7,912,701 | B1* | 3/2011 | Gray ....................... G06F 40/30 704/7 |
| 7,925,974 | B1* | 4/2011 | McConnell ........... G06F 16/345 715/260 |
| 8,126,713 | B2* | 2/2012 | Huang ................... G06F 40/268 704/254 |
| 8,731,929 | B2* | 5/2014 | Kennewick ......... G10L 15/1822 704/270.1 |
| 9,633,063 | B2* | 4/2017 | Leeds .................... G06F 40/289 |
| 10,282,663 | B2 | 5/2019 | Socher et al. |
| 10,346,721 | B2 | 7/2019 | Albright et al. |
| 10,740,406 | B2* | 8/2020 | Koutrika ................. G06F 16/93 |

(Continued)

*Primary Examiner* — Neeraj Sharma
(74) *Attorney, Agent, or Firm* — Haynes and Boone, LLP

(57) ABSTRACT

Embodiments described herein provide a pipelined natural language question answering system that improves a BERT-based system. Specifically, the natural language question answering system uses a pipeline of neural networks each trained to perform a particular task. The context selection network identifies premium context from context for the question. The question type network identifies the natural language question as a yes, no, or span question and a yes or no answer to the natural language question when the question is a yes or no question. The span extraction model determines an answer span to the natural language question when the question is a span question.

18 Claims, 9 Drawing Sheets

(56) References Cited

U.S. PATENT DOCUMENTS

| | | | |
|---|---|---|---|
| 10,885,282 B2 * | 1/2021 | Ilić | G06F 40/211 |
| 2009/0106203 A1 * | 4/2009 | Shi | G06F 16/9577 |
| 2009/0287685 A1 * | 11/2009 | Charnock | G06F 16/38 |
| | | | 707/999.005 |
| 2014/0047253 A1 * | 2/2014 | Kim | G10L 19/00 |
| | | | 713/320 |
| 2014/0120961 A1 * | 5/2014 | Buck | G06F 1/329 |
| | | | 455/466 |
| 2016/0140221 A1 * | 5/2016 | Park | G06F 16/3331 |
| | | | 715/254 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher | |
| 2017/0213469 A1 * | 7/2017 | Elchik | G09B 7/02 |
| 2018/0082171 A1 | 3/2018 | Merity et al. | |
| 2018/0096219 A1 | 4/2018 | Socher | |
| 2018/0101504 A1 * | 4/2018 | DiTomaso | G10L 13/00 |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0336198 A1 | 11/2018 | Zhong et al. | |
| 2018/0336453 A1 | 11/2018 | Merity et al. | |
| 2018/0349359 A1 | 12/2018 | Mccann et al. | |
| 2018/0373682 A1 | 12/2018 | Mccann et al. | |
| 2018/0373987 A1 | 12/2018 | Zhang et al. | |
| 2019/0130206 A1 | 5/2019 | Trott et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258901 A1 | 8/2019 | Albright et al. | |
| 2019/0258939 A1 | 8/2019 | Min et al. | |
| 2019/0286073 A1 | 9/2019 | Asl et al. | |
| 2019/0295530 A1 | 9/2019 | Asl et al. | |
| 2019/0311002 A1 | 10/2019 | Paulus | |

\* cited by examiner

| Question | Paragraph 1 | Paragraph 2 | Reasoning Skill |
|---|---|---|---|
| In the seventh-largest country in Africa, what is the oil production of the city at the mouth of the Congo River? | Angola, officially the Republic of Angola, is a country in Southern Africa. It is the seventh-largest country in Africa and is bordered by Namibia to the south, the Democratic Republic of the Congo to the north, Zambia to the east, and the Atlantic Ocean to west. | Soyo (formerly known as Santo Antonio do Zaire) is a city located in the province of Zaire in Angola, at the mouth of the Congo river. Soyo recently became the largest oil-producing region in the country, with an estimate of 1200000 oil bbl/d. | category bridge s/n multiple sub category word match entity word match (easy) |
| In what country was the actor Chris Hemsworth, one of the stars in the motion picture Thor, born? | Chris Hemsworth (born 11 August 1983) is an Australian actor. He is known for playing Kim Hyde in the Australian TV series "Home and Away" (2004-07) and Thor in the Marvel Cinematic Universe since 2011. Hemsworth has also appeared in the science fiction action film "Star Trek". | Thor: The Dark World is a 2013 American superhero film based on the Marvel Comics character Thor, produced by Marvel Studios and distributed by Walt Disney Studios Motion Pictures. It stars Chris Hemsworth, Natalie Portman, Tom Hiddleston, Anthony Hopkins. | category bridge s/n single sub category word match entity |
| Which women's magazine published first, Mirabella or Home Monthly? | Mirabella was a women's magazine published from June 1989 to April 2000. It was created by and named for Grace Mirabella, a former "Vogue" editor in chief, in partnership with Rupert Murdoch. | Home Monthly was a monthly women's magazine published in Pittsburgh, Pennsylvania in the late 19th century. ← 330  ← 320  ← 310 | category comparison s/n multiple sub category numerical |

FIG. 3

SYSTEMS AND METHODS FOR READING COMPREHENSION FOR A QUESTION ANSWERING TASK

PRIORITY APPLICATION DATA

This application is a continuation of U.S. patent application Ser. No. 16/695,494, filed Nov. 26, 2019, now allowed, which claims priority to U.S. Provisional Application No. 62/851,048, filed on May 21, 2019 and entitled "Systems and Methods for Reading Comprehension for a Question Answering Task," which are incorporated by reference in their entireties.

TECHNICAL FIELD

The disclosure relates generally to training and use of machine learning systems and more specifically to a reading comprehension model for a question answering task.

BACKGROUND

Pretrained bidirectional language models (e.g., Bidirectional Encoder Representations from Transformers or BERT models) have been used in many natural language processing tasks, such as question answering, classification, and/or the like. However, for some more challenging questions, the performance of such models may be unsatisfactory compared to human-level accuracy and techniques for improving BERT models are desired.

BRIEF DESCRIPTION OF THE DRAWINGS

FIG. 3 is a graph that illustrates question-paragraphs pairs in a HotpotQA dataset, according to some embodiments.

In the figures, elements having the same designations have the same or similar functions.

DETAILED DESCRIPTION

In view of the need to improve accuracy in question answering models, the embodiments describe a pipeline question answering model. The pipeline question answering model includes a context selection module that selects premium context from a context, such as a text or a document, using context and natural language question as input. The pipeline question answering model also includes a yes-no span module that identifies a type of a natural language question, such as a yes, no, or span question using the premium context and natural language question as input. Additionally, the pipeline question answering model includes a span extraction module that identifies an answer span from the premium context for the span question. In some embodiments, the context selection module, the yes-no span module, and the span extraction module may be implemented sequentially or in parallel as BERT models, each trained to perform a particular task.

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Figure 1:
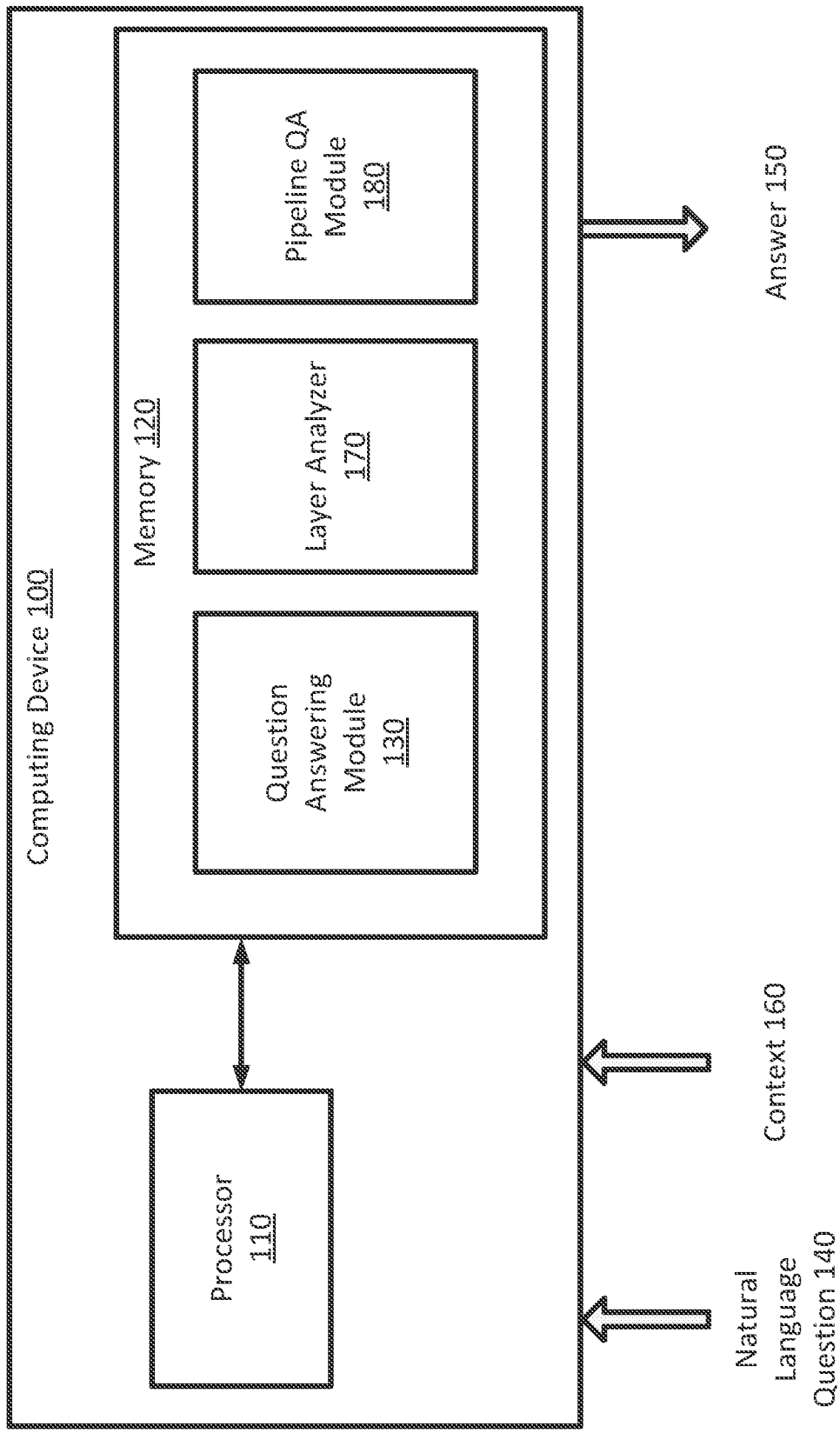
FIG. 1 is a simplified diagram of a computing device implementing a question answering system, according to some embodiments.

FIG. 1 is a simplified diagram of a computing device 100 for implementing a question answering system according to some embodiments. As shown in FIG. 1, computing device 100 includes a processor 110 coupled to a memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for QA module 130 that may be used to implement and/or emulate the systems and models, and/or to implement any of the methods described further herein. In some examples, QA module 130 may be used to receive and handle the input of a natural language question 140. In some embodiments, QA module 130 may generate answer 150 for natural language question 140 using context 160. Context 160 may be a dataset, document, text, one or more paragraphs, etc. In some embodiments, QA module 130 may also handle the iterative training and/or evaluation of a system or model used for question answering tasks.

In some embodiments, context 160 may be a document, text or paragraph(s) included in a SQuAD or HotpotQA dataset. The SQuAD (Stanford Question Answering Dataset) may be a reading comprehension dataset that contains human-annotated answer spans for pairs that include a question and a single paragraph in each pair. An example pair in a SQuAD that includes a question Q and paragraph P is shown in Table 1, replicated below. An answer A ("France") to a question Q ("In what county is Normandy located?") in the question-paragraph pair is also shown in Table 1.

TABLE 1

| | SQUAD | | HotpotQA Bridge | | Comparison |
|---|---|---|---|---|---|
| Q | In what country is Normandy located? | Q | In what year was Kasper Schmeichel's father born? | | Which band was formed first Killing Joke or Acceptance? |
| P | The Normans (Norman: Nourmands; French: Normands; Latin: Normanni) were the people who in the 10th and 11th centuries gave their name to Normandy, a region in France. | P1 P2 | Kasper Peter Schmeichel is a Danish professional footballer. He is the son of Peter Schmeichel. Peter Bolesaw Schmeichel (born 18 Nov. 1963) is a professional footballer who played as a goalkeeper. | | Killing Joke are an English rock band formed in October 1978 in Notting Hill, London, England. Acceptance is an American rock band from Seattle, Washington. formed in 1998. |
| A | France | A | 1963 | | Killing Joke |

In some embodiments, the HotpotQA dataset may be a reading comprehension dataset that may provide an answer to a question using pairs that include a question and multiple paragraphs in each pair. The number of paragraphs in each pair may be ten but may also be configured to include a different number of paragraphs. In some embodiments, a question in the HotpotQA dataset may be characterized into a bridge question or a comparison question. A bridge question may have one or more hops between the paragraphs in the question-paragraphs pair to determine an answer the question. A comparison question may compare entities in the one or more paragraphs in the question-paragraphs pair. Example bridge question in Table 1 is "In what year was Kasper Schmeichel's father born?" and example comparison question is "Which band was formed first Killing Joke or Acceptance?"

In some embodiments, one or more paragraphs in the question-paragraphs pair in the HotpotQA dataset may be annotated to include supporting facts. These paragraphs may be referred to as premium context or "gold" paragraphs. The "gold" paragraphs may be top-2 paragraphs based on the probability values that may include an answer to a question or paragraphs that have the probability of including an answer to a question above a configurable threshold. Table 1, above, illustrates an example question-paragraphs pair in a HotpotQA dataset, that includes a question Q and paragraphs P1 and P2. In a non-limiting embodiment, paragraphs P1 and P2 are "gold" paragraphs that determine an answer A to the question Q.

In some embodiments, QA module 130 may be a BERT (Bidirectional Encoder Representations from Transformers) network. The BERT network may be a neural network that has multiple layers, where each layer has one or more bi-directional transformer encoders. Some BERT networks may have 12 or 24 layers. Additionally, the transformer encoders may have vector(s) of weights that may manipulate input and generate output. With an exception of the first and last layers, the encoders at each layer may be connected to one or more encoders of the preceding layer and generate an output that is an input to the one or more encoders at the subsequent layer. The first layer in the network may receiving input, e.g., natural language question 140 and context 160, while the last layer may output an answer, e.g., answer 150 to natural language question 140. At each layer, the encoders may generate an output by applying a vector of weights to the input. Typically, the weights may be determined by training the QA module 130.

As discussed above, QA module 130 may receive natural language question 140 and context 160 as input. Natural language question 140 and context 160 may be broken up into tokens, e.g., each word in natural language question 140 may be a token. Once QA module 130 receives tokens for natural language question 140 and context 160, QA module 130 may determine answer 150 to natural language question 140 by passing the tokens from natural language question 140 and context 160 through the layers in QA module 130 where the weights of the transformer encoders act on the tokens. At a final layer of QA module 130, the encoders may generate answer 150 to natural language question 140.

In some embodiments, QA module 130 may be trained to determine answer 150 for natural language question 140 using context 160. During training, QA model 130 may receive natural language question 140 and context 160 and train the weights in the vectors to store values that cause QA module 130 to output a known answer 150. Once trained, QA module 130 may receive natural language question 140 and context 160 and generate answer 150.

In some embodiments, QA module 130 may include one or more attention heads in each layer. In one example, a 12-layer model may include 12 attention heads, one attention head per layer. In another example, a 24-layer model may include 16 attention heads, where some layers may include one or more attention heads. Attention heads, like encoders, may receive tokens included in natural language question 140 or context 160 and apply the matrices or vectors that may generate attention weights for each token. Attention weights may indicate importance of each token in the sequence of tokens in relationship with other tokens in the sequence. For example, with respect to question "In what country is Normandy located?" the attention heads in QA module 130 may generate an attention weight for tokens "in," "what," "country," "is," "Normandy," and "located," and use the weights to determine an importance of these tokens to each other.

In some embodiments, memory 120 may include a layer analyzer 170. Layer analyzer 170 may be a software or hardware component that analyzes QA module 130 and determines the portions of context 160 that QA module 130 may read when QA module 130 determines answer 150 for natural language question 140. To determine the portions of context 160 that QA module 130 may read, layer analyzer 170 may analyze attention heads at each layer. For example, for each layer, layer analyzer 170 may determine a sum of the weights of the attention heads for each token. Layer analyzer 170 may then map the summed weights to the tokens in natural language question 140 and context 160. The higher the attention weights for a token, the more emphasis QA module 130 may place on the token as compared to other tokens. In some embodiments, when context 160 is from HotpotQA dataset, layer analyzer 170 may analyze tokens from the "gold" paragraphs in context 160, and not other paragraphs. As discussed above, this is because the "gold" paragraphs likely include answer 150 to natural language question 140.

In some embodiments, layer analyzer 170 may analyze the summed attention weights for the tokens at each layer. Layer analyzer 170 may use the sums to determine the portions of natural language question 140 and context 160 that QA module 130 reads at each layer.

Figure 2A:
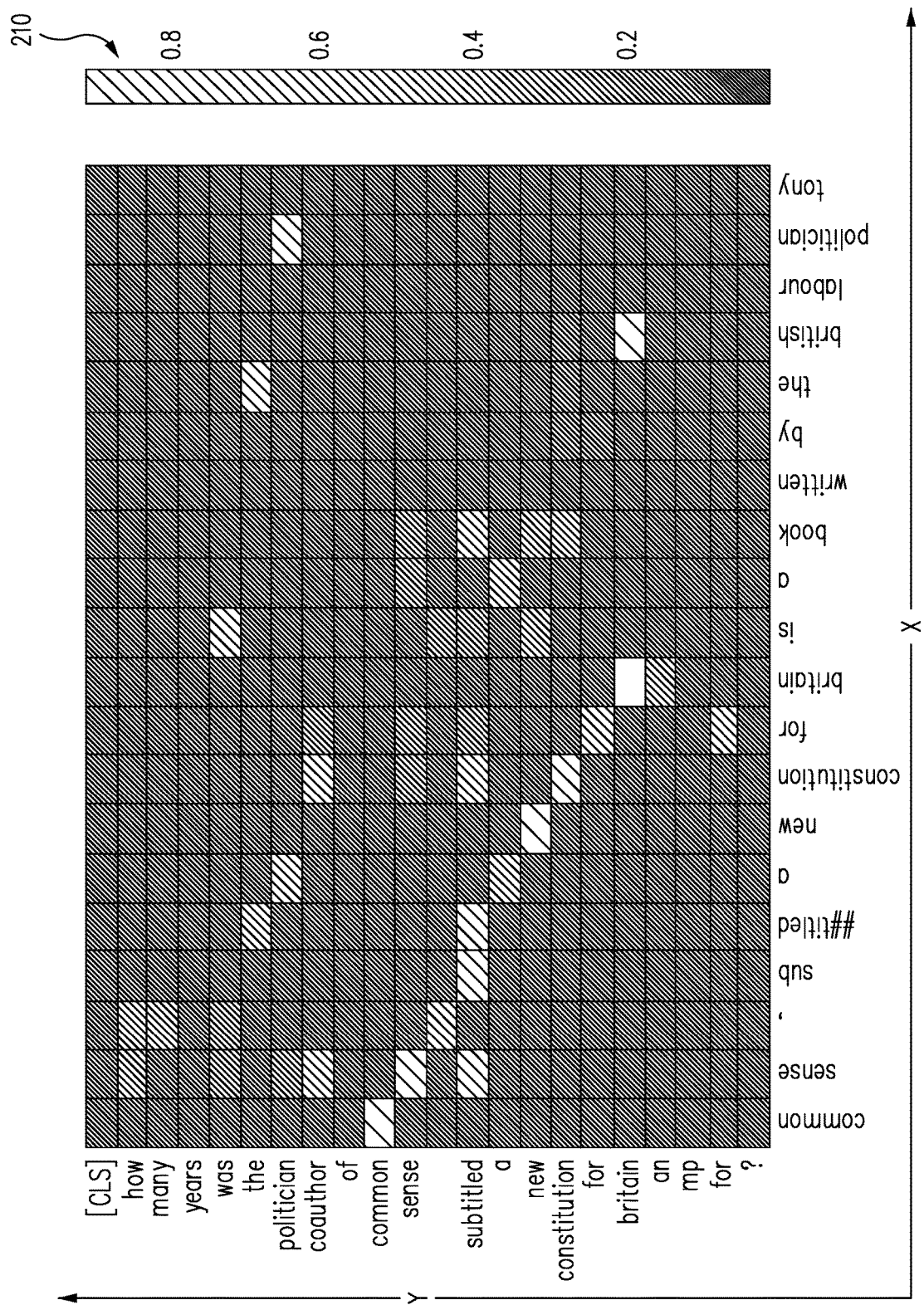
FIGS. 2A-2C are graphs that illustrate sums of attention weights on tokens at different layers of a BERT model, according to some embodiments.
Figure 2B:
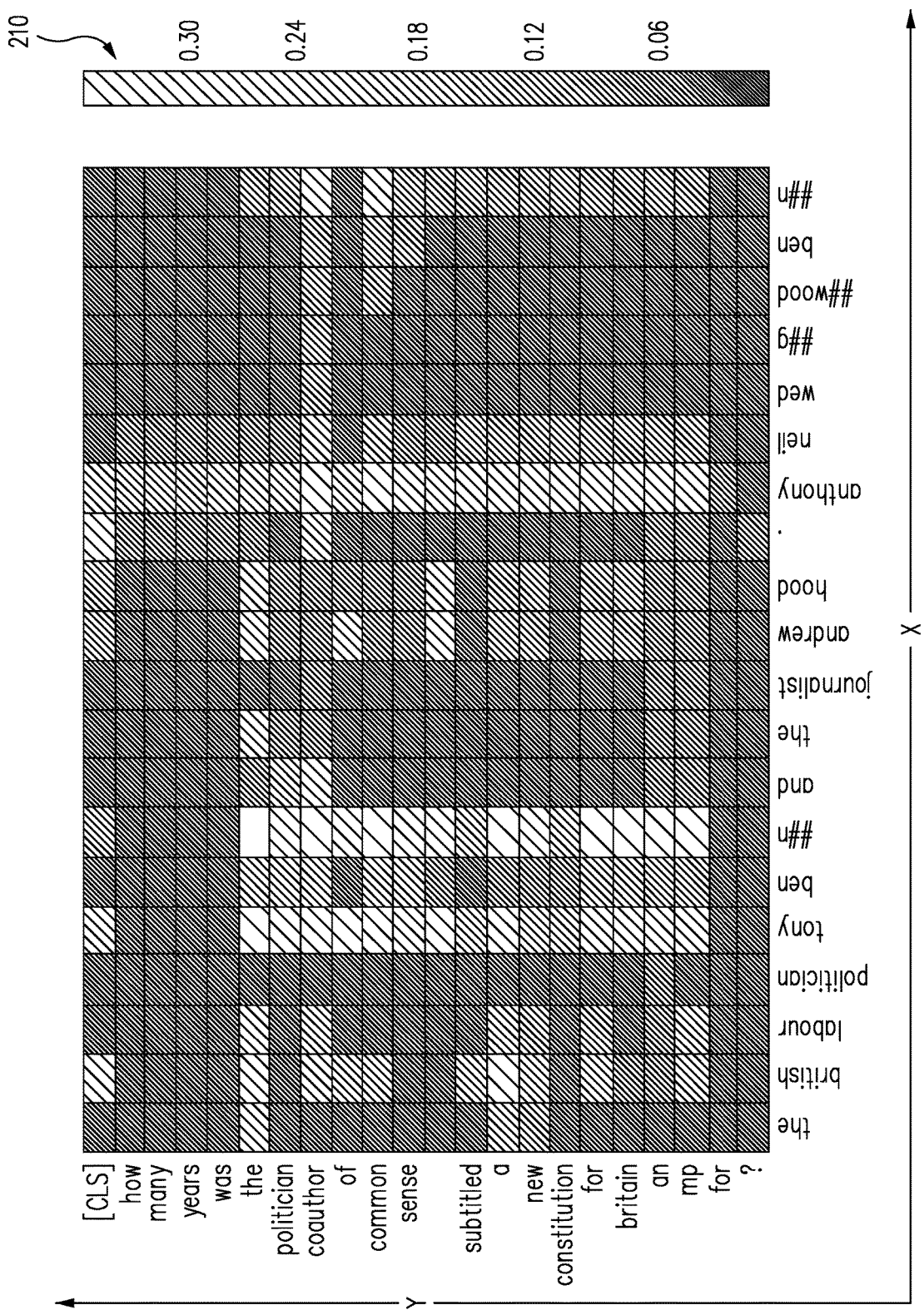
Figure 2C:
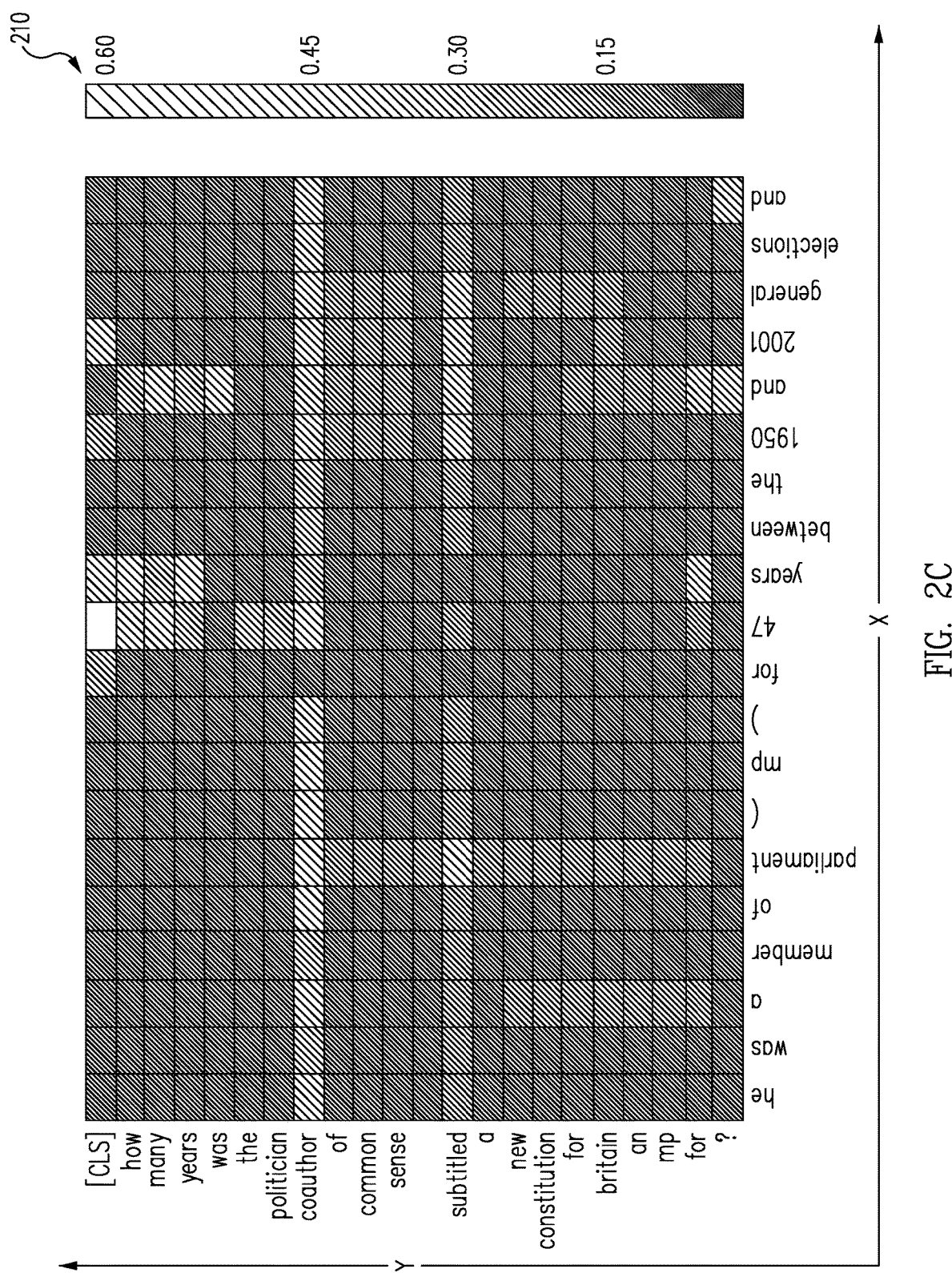

FIGS. 2A-2C are graphs that illustrate the mapping of the summed attention weights for tokens at layer two, layer nine, and layer twelve of a 12-layer QA model. In FIGS. 2A-2C the sum of attention weights for tokens for context 160 is shown on the "x" axis and for tokens from natural language question 140 is shown on the "y" axis. FIGS. 2A-2C also include a legend 210 that maps the summed attention weight to a color, where the higher the sum of the attention weights, the lighter is the corresponding color and the lower the sum of the attention weights, the darker is the corresponding color.

In some embodiments, layer analyzer 170 may determine that at the lower layers QA module 130 may focus on lexical or semantic matching between the tokens from natural language question 140 and tokens from context 160. FIG. 2A illustrates that at layer 2, QA module 130 focuses on the tokens "Britain" from natural language question 140 and context 160 because these tokens have the lightest color and hence the highest score in FIG. 2A. Also, QA module 130 focuses on token "Britain" from natural language question 140 and token "British" from context 160, and tokens "common" from natural language question 140 and context 160 because these tokens also have high scores as shown in the mapping in legend 210.

In some embodiments, layer analyzer 170 may determine that at higher layers QA module 130 may focus important terms, such as answer phrases or key words that may later be used to determine answer 150. FIG. 2B illustrates that at layer 9 of the 12-layer QA module 130, the mapping illustrates that QA module 130 focuses on the tokens "Tony" and "Ben" from context 160 shown in the "x" axis since those tokens have high scores as compared to other tokens. The tokens "Tony" and "Ben" are mapped to multiple tokens in the "y" axis that shows tokens from natural language question 140. This indicates that tokens "Tony" and "Ben" may be important terms in context 160 that may be associated with answer 150 to natural language question 140.

As illustrated in FIG. 2C, at a final layer of the 12-layer QA module 130, layer analyzer 170 may determine that QA module 130 focuses on possible answer candidates for answer 150. As illustrated in FIG. 2C, token "47" has the highest weighted attention score and answer 150 to natural language question 140.

Accordingly, based on FIGS. 2A-2C, layer analyzer 170 may determine that QA module 130 may initially place importance on answer types and semantic relationships at lower layers before finalizing answer candidates for answer 150 at the higher layers.

In some embodiments, layer analyzer 170 may also analyzer the top K attended words (represented as tokens) in the layers of QA module 130. K may be a positive integer. To analyze the top K attended words, QA module 130 may receive context 160 where key entities are annotated for multi-sentence reasoning and comprehension. FIG. 3 is a chart that illustrates three question-paragraphs pairs in a HotpotQA dataset. As discussed above, the paragraphs may be "gold" paragraphs that are premium context in context 160 for natural language question 140. The paragraphs are annotated with annotations 310, 320, and 330. Annotations 310 may indicate key entity and key phrases in the paragraphs, annotations 320 may indicate answers, and annotations 330 may indicate words that overlap in the paragraphs.

Figure 4A:
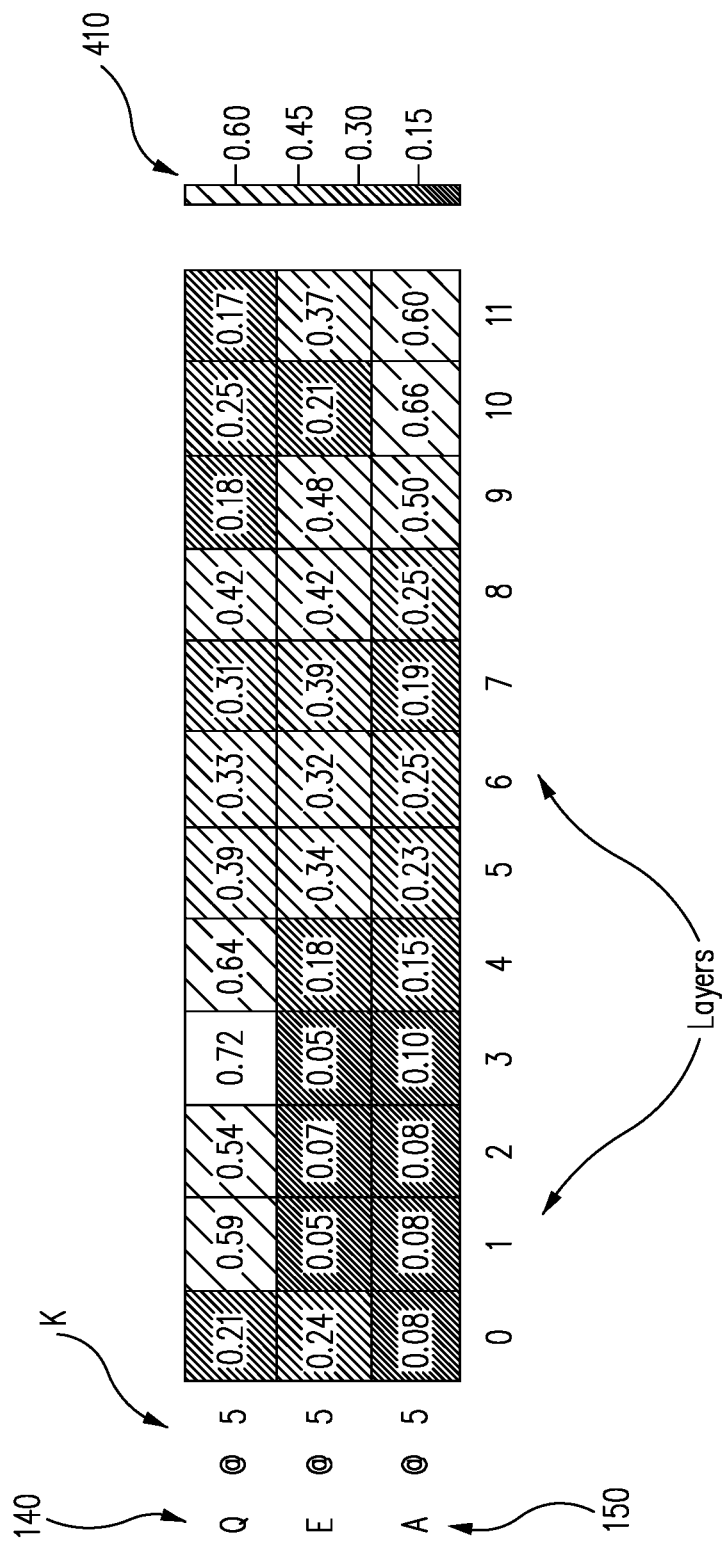
FIGS. 4A-4B are graphs that illustrate the scores for attended tokens in each layer of a BERT model, according to some embodiments.
Figure 4B:
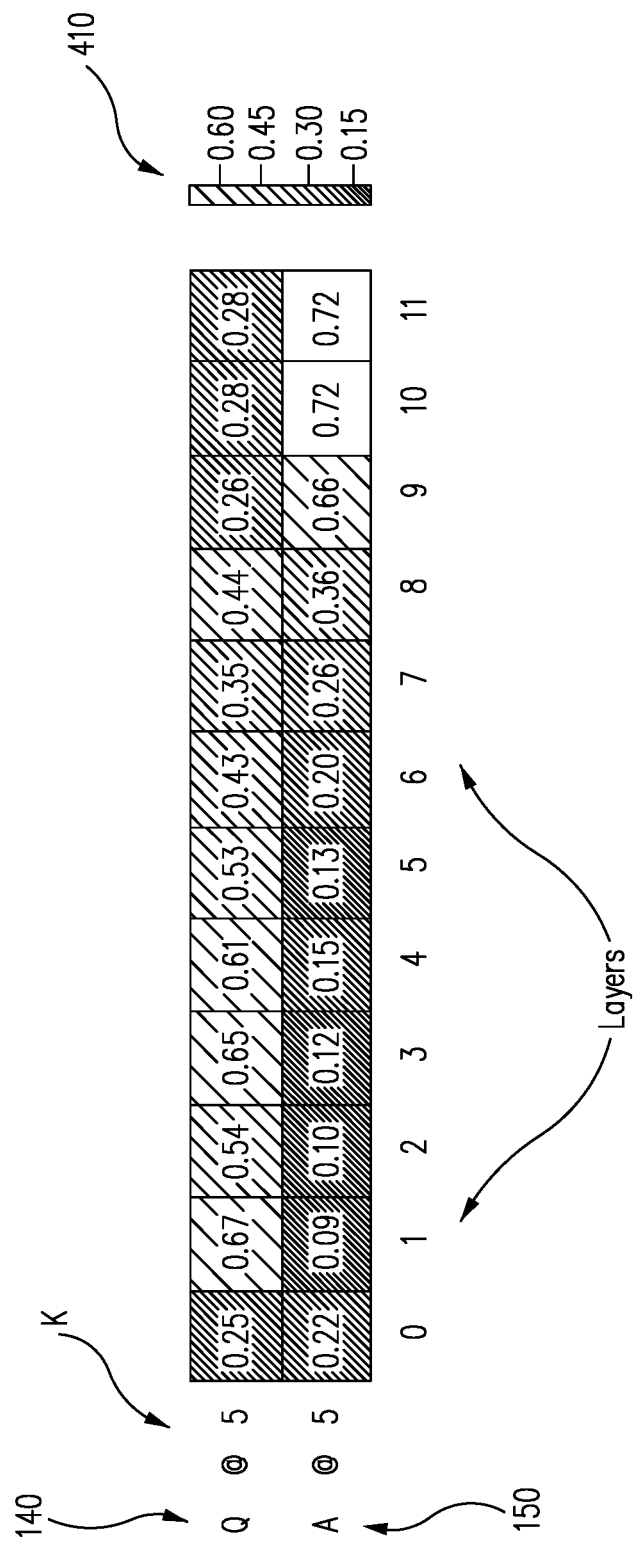
Figure 5:
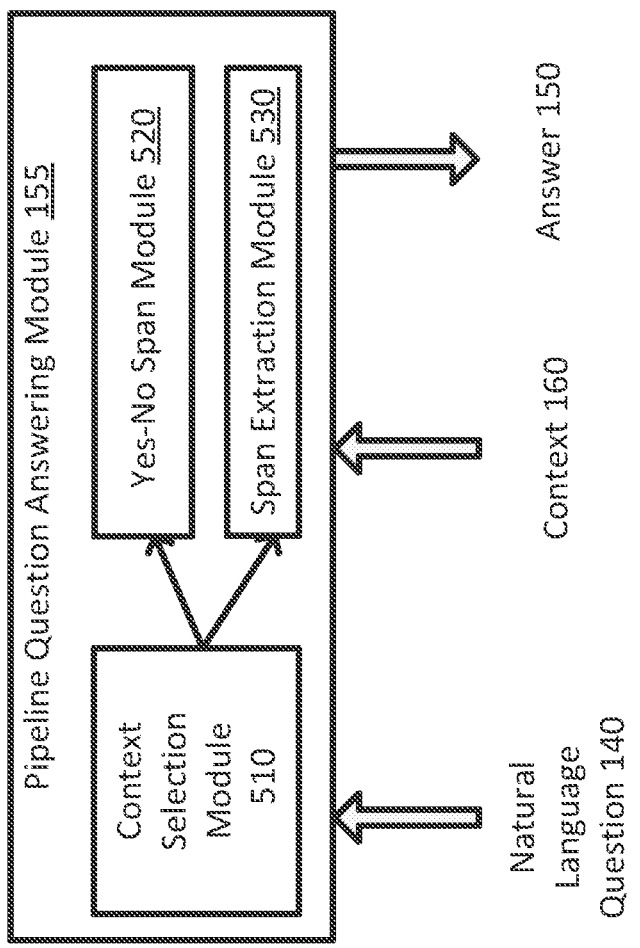
FIG. 5 is a block diagram of a pipeline question answering module, according to some embodiments.

In some embodiments, layer analyzer 170 may evaluate a score at each layer for the K attended words in natural language question 140, context 160, and answer 150. Layer analyzer 170 may determine score as follows:

$$S_d^{q,q,e} = \frac{1}{N}\sum_{k=1}^{N} \frac{c(x_i)}{\min(l(x_i), K)} \quad \text{Equation 1}$$

where $x_i$ is either the i-th {natural language question 140, answer 150, or key phrases}, $l(x_i)$ is the length for $x_i$, and $c(x_i)$ counts how many words in $x_i$ are covered by the top-K list. FIGS. 4A and 4B are diagrams that illustrate the scores for the 12 layers (layers 0 through 11) of a 12-layer QA module 130 for the words K in natural language question 150 (Q) and answer 140 (A) for HotpotQA and SQuAD datasets respectively. FIG. 4A also illustrates annotated key entity (E) that is used to bridge multi-sentence or paragraph reasoning. FIGS. 4A and 4B also include a legend 410 that maps the scores to colors, with higher scores having lighter colors, according to some embodiments.

In some embodiments, FIG. 4A illustrates that QA module 130 receives context 160 from HotpotQA dataset and first captures the interactions within natural language question 140 as illustrated by the higher scores for K words in question Q in layers 1-5. Next, QA module 130 gradually captures the key entities E as illustrated by the scores for K words in layers 5-9. Next, QA module 130 finalizes answer 140 as illustrated by the higher scores for K words in layers 9-11 for answer A.

In some embodiments, FIG. 4B illustrates that QA module 130 receives context 160 from SQuAD dataset and first captures the interactions within natural language question 140 as illustrated in layers 1-5 that have relatively high scores for K words in question Q. Then, QA module 130 gradually finalizes answer 150 as illustrated by the relatively high scores for K words in layers 9-11 for answer A.

In some embodiments, memory 120 also includes instructions for a pipeline QA module 180 that may be used to implement and/or emulate the systems and models, and/or to implement any of the methods described further herein. Like QA module 130, pipeline QA module 180 may receive natural language question 140 and context 160 as input and determines answer 150. In some embodiments, pipeline QA module 180 may include multiple QA modules that may be the same or different from QA module 130, but that are further trained or "fine-tuned" to execute a particular task. To fine-tune QA module 130, an extra one or more layers may be added to QA module 130 and the transformer encoders in the added layer(s) may be trained to perform a particular task. In some embodiments, pipeline QA module 180 may include a context selection module 510, a yes-no span module 520, and a span extraction module 530, which may be serially connected or connected in other manners, and which are may be variants of QA module 130 discussed above.

In some embodiments, context selection module 510 may select premium context (e.g. "gold" paragraphs) from context 160. As discussed above, premium context may include answer 150 to natural language question 140. For example, context selection module 510 may receive tokens for natural language question 140 and context 160 that includes, e.g. ten paragraphs and may select premium context such as "gold" paragraphs from context 160. To select the premium context, context selection module 510 may use a BERT model with a classifier. The classifier may be included in the last or extra classification layer that classifies, for example, each paragraph in context 160 as premium context or not as premium context. The classification may be a binary classification where "0" or "1" may indicate the premium context. In some embodiments, context selection module 510 may classify the premium context as the top two paragraphs that have the highest probability that they are premium paragraphs. In other embodiments, context selection module 510 may classify premium context as paragraphs that have a probability that the paragraphs are premium above a configurable or predefined probability threshold.

In some embodiments, to classify context 160 into premium and non-premium context, context selection module 510 may be trained or pre-trained and fine-tuned. For example, context selection module 510 may be a pre-trained BERT model where the classification layer is fine-tuned using context 160 that includes known premium context and natural language question 140 until context selection module 510 identifies the premium context as premium.

In some embodiments, yes-no span module 520 may be a question type module that determines whether natural language question 140 is a "yes," "no," or "span" question. The "yes" or "no" question may have an answer that is a "yes" or a "no." The "span" question is a question that may be answered using a sentence or an answer span. The "span" question may also be a question that is not a "yes" or "no" question. In some embodiments, yes-no span module 520 may use a BERT three-class classification model. The BERT three-class classification model may be a BERT model with an extra layer that uses three-way classification to classify natural language question 140 as a "yes," "no," or "span" question. The input to yes-no span module 520 may be natural language question 140 and the premium context which, in some embodiments, may be the output of context selection module 510. The output of yes-no span module 520 may be a classifier that identifies natural language question 140 as a "yes," "no," or "span" question. To classify natural language question 140 as a "yes," "no," or "span" question, context selection module 510 may be trained or pre-trained and fine-tuned. For example, yes-no span module 520 may be a pre-trained BERT model where the three-way classification layer is fine-tuned using context 160 and known "yes," "no," and "span" natural language questions until yes-no span module 520 correctly classifies the natural language questions as "yes," "no," or "span" questions.

In the embodiments where yes-no span module 520 classifies natural language question 140 as a "yes" or "no" question, pipeline QA module 180 determines that answer 150 to natural language question 140 is "yes" or "no." In this case, pipeline QA module 180 may adopt the classifier from yes-no span module 520 as answer 150. On the other hand, in the embodiments where yes-no span module 520 classifies natural language question 140 as a "span" question, pipeline QA module 180 may use a span extraction module 530 to determine answer 150.

In some embodiments, span extraction module 530 may determine an answer span for natural language question 140 that yes-no span module 520 identified as a "span" question. Span extraction module 530 may be configured to implement a BERT classification model to extract an answer span that is answer 150. In some embodiments, the input to span extraction module 530 may be natural language question 140 and the premium context which may be the output of context selection module 510. In some embodiments, span extraction module 530 may include a BERT model that may be trained using a SQuAD dataset.

In some embodiments, QA module 130, layer analyzer 170, pipeline QA module 180, context selection module 510, yes-no span module 520, and span extraction module 530, may be implemented using hardware, software, and/or a combination of hardware and software.

Figure 6:
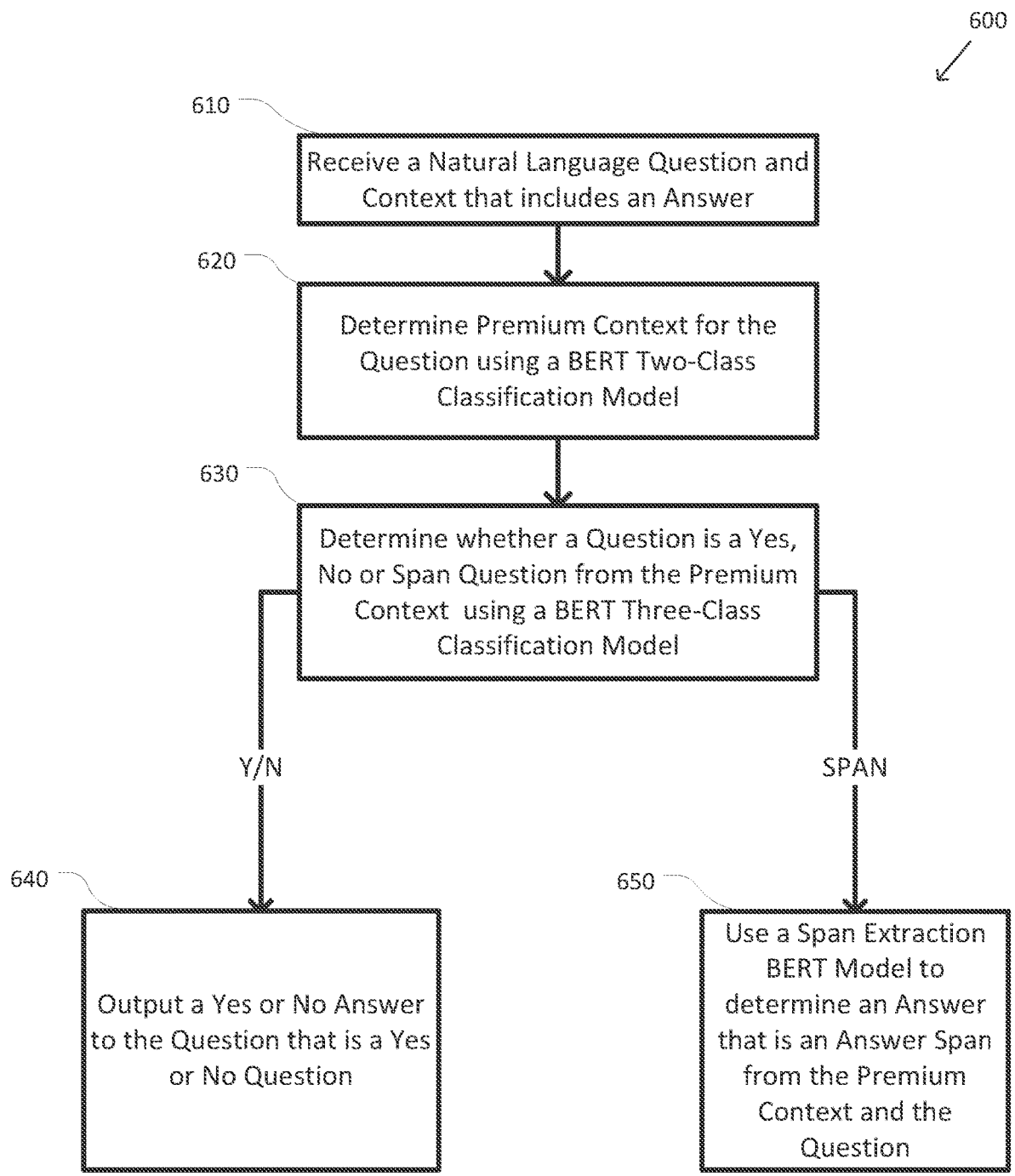
FIG. 6 is a simplified logic flow diagram illustrating a method for determining an answer to a natural language question, according to some embodiments.

FIG. 6 is a simplified logic flow diagram illustrating a method 600 for generating an answer to a natural language question using a pipeline QA module, according to some embodiments. One or more of the processes 610-650 of method 600 may be implemented, at least in part, in the form of executable code stored on non-transitory, tangible, machine-readable media that when run by one or more processors may cause the one or more processors to perform one or more of the processes 610-650. In some embodiments, method 600 may correspond to the method used by the pipeline QA module 180 to perform different question answering tasks.

At a process 610, a context and a natural language question are received. For example, pipeline QA module 180 may receive context 160 and natural language question 140.

At a process 620, premium context is determined from the context and natural language question 140. For example, context selection module 510 may include a BERT classification model that classifies portions (e.g. paragraphs) of context 160 as premium or non-premium context.

At process 630, the type of the natural language question is determined. For example, yes-no span module 520 may determine whether natural language question 140 is a "yes," "no," or "span" question using the context paragraphs determined in process 620 and natural language question 140. As discussed above, yes-no span module 520 may be a BERT three-class classification model. When yes-no span module 520 determines that natural language question 140 is a "yes" or "no" question, method 600 proceeds to process 640. When yes-no span module 520 determines that natural language question 140 is a "span" question, method 600 proceeds to process 650.

At process 640, an answer to a natural language question is outputted. Answer 150 may be a classification of yes-no span module 520 that is a "yes" or "no" answer to natural language question 140.

At a process 650, an answer is determined. For example, span extraction module 530 may determine an answer span for natural language question 140 from context paragraphs determined in process 620. The answer span is answer 150.

As illustrated in Table 2, below, pipeline QA module 180 may outperform a conventional BERT model, a BERT model with a sliding window (the sliding window receives a maximum number of paragraphs from the context at a time and then slides to receive another maximum number of paragraphs from the context), and a dynamic feature generation network (DFGN) that combines a BERT model with convolutional neural networks for determining an answer as compared to human accuracy when answering a question.

TABLE 2

| Method | HotpotQA | | P |
| --- | --- | --- | --- |
| | F1 | EM | EM |
| Human | 91.40 | 83.60 | — |
| BERT (base, aliding window) | 60.49 | 47.25 | — |
| P-BERT (base, threshold) | 69.90 | 56.39 | 71.24 |
| P-BERT (base) | 70.16 | 57.80 | 89.39 |
| P-BERT (large) | 74.60 | 60.58 | 89.39 |
| Baseline | 38.25 | 44.44 | — |
| DFGN | 69.23 | 55.42 | — |

Table 2 also illustrates the results from three different pipeline QA modules 180 illustrated in Table 2. The three pipeline QA modules 180 are P-BERT module (base, threshold), P-BERT module (base) and P-BERT module (large). The P-BERT module (base, threshold) has context selection module 510 that selects premium paragraphs from context 160 that have a probability threshold of 0.1. P-BERT module (base) includes a 12-layer BERT model(s), and P-BERT (large) includes a 24-layer BERT model(s). Further, Table 2 illustrates results for context 160 that is part of a HotpotQA dataset that includes multiple paragraphs and results for context 160 that is part of a single paragraph dataset, such as SQuAD (shown as P in Table 2).

As Table 2 illustrates, BERT module (base, threshold), P-BERT module (base) and P-BERT module (large) show improvements in determining answer 150 from conventional BERT and DFGN models. Table 2 also illustrates that the P-BERT models may or may not use a probability threshold when selecting premium context. This is because the accuracy of answer 150 determined using BERT module (base, threshold) and P-BERT module (base) is approximately the same. Table 2 model further illustrates that a BERT model that uses a sliding window has results that are below those of the P-BERT modules which illustrates that the sliding window may or may not select premium context or "gold" paragraphs when determining an answer.

Some examples of computing devices, such as computing device 100 may include non-transitory, tangible, machine readable media that include executable code that when run by one or more processors (e.g., processor 110) may cause the one or more processors to perform the processes of method 600. Some common forms of machine readable media that may include the processes of method 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
   receiving, at a pipeline neural network, an input text of a natural language question and context that provides an answer to the natural language question;
   selecting, using a context selection network in the pipeline neural network, a premium context from the context, wherein the premium context includes at least two paragraphs;
   determining, using a question type network in the pipeline neural network, a type of the natural language question, wherein the question type network includes a Bidirectional Encoder Representations from Transformers (BERT) model and a classification layer and further comprising training the classification layer for determining the type of the natural language question; and
   determining the answer to the natural language question as a yes or no answer when the type of the natural language question is a yes or a no question.

2. The method of claim 1, wherein a span extraction network includes a BERT model that is trained using a question-paragraph dataset to determine an answer span for the answer.

3. The method of claim 1, wherein the context selection network includes a classifier neural network for classifying a first portion of the context as the premium context and a second portion of the context as a non-premium context.

4. The method of claim 1, wherein the context includes a plurality of paragraphs and the premium context includes at least one paragraph in the plurality of paragraphs having a probability above a probability threshold.

5. The method of claim 1, wherein the question type network includes a three-classifier neural network for classifying the type of the natural language question as the yes question, the no question, or the span question.

6. The method of claim 1, wherein the context selection network includes a BERT model and a classification layer and further comprising training the classification layer for selecting the premium context from the context.

7. A method comprising:
receiving, at a pipeline neural network, an input text of a natural language question and context that provides an answer to the natural language question;
selecting, using a context selection network in the pipeline neural network, a premium context from the context, wherein the premium context includes at least one paragraph having a probability above a probability threshold;
determining, using a question type network in the pipeline neural network, a type of the natural language question, wherein the question type network includes a Bidirectional Encoder Representations from Transformers (BERT) model and a classification layer and further comprising training the classification layer for determining the type of the natural language question; and
determining the answer to the natural language question as a yes or no answer when the type of the natural language question is a yes or a no question.

8. The method of claim 7, wherein a span extraction network includes a BERT model that is trained using a question-paragraph dataset to determine an answer span for the answer.

9. The method of claim 7, wherein the context selection network includes a classifier neural network for classifying a first portion of the context as the premium context and a second portion of the context as a non-premium context.

10. The method of claim 7, wherein the question type network includes a three-classifier neural network for classifying the type of the natural language question as the yes question, the no question, or the span question.

11. The method of claim 7, wherein the context selection network includes a BERT model and a classification layer and further comprising training the classification layer for selecting the premium context from the context.

12. A non-transitory machine-readable medium having stored thereon machine-readable instructions executable to cause a machine to perform operations that determine an answer to a natural language question, the operations comprising:
receiving, at a pipeline neural network, an input text of the natural language question and context that provides the answer to the natural language question;
selecting, using a context selection network in the pipeline neural network, a premium context from the context;
determining, using a question type network in the pipeline neural network, a type of the natural language question, wherein the question type network includes a three-classifier neural network for classifying the type of the natural language question as the yes question, the no question, or the span question; and
determining the answer to the natural language question as a yes or no answer when the type of the natural language question is a yes or a no question.

13. The non-transitory machine-readable medium of claim 12, wherein the context selection network includes a classifier neural network for classifying a first portion of the context as the premium context and a second portion of the context as a non-premium context.

14. The non-transitory machine-readable medium of claim 12, wherein the context includes a plurality of paragraphs and the premium context includes at least two paragraphs.

15. The non-transitory machine-readable medium of claim 12, wherein the context includes a plurality of paragraphs and the premium context includes at least one paragraph in the plurality of paragraphs having a probability above a probability threshold.

16. The non-transitory machine-readable medium of claim 12, wherein the context selection network includes a Bidirectional Encoder Representations from Transformers (BERT) model and a classification layer and further comprising training the classification layer for selecting the premium context from the context.

17. The non-transitory machine-readable medium of claim 12, wherein the question type network includes a Bidirectional Encoder Representations from Transformers (BERT) model and a classification layer and further comprising training the classification layer for determining the type of the natural language question.

18. The non-transitory machine-readable medium of claim 12, wherein a span extraction network includes a BERT model that is trained using a question-paragraph dataset to determine an answer span for the answer.

\* \* \* \* \*